(12) United States Patent  
Evans et al.

(10) Patent No.: US 8,517,272 B1
(45) Date of Patent: Aug. 27, 2013

(54) METHOD TO DIFFERENTIATE AIMING FROM ACTIVE DECODING

(75) Inventors: John P. Evans, Levittown, NY (US); Frank Y. Wu, Brooklyn, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/455,287

(22) Filed: Apr. 25, 2012

(51) Int. Cl.
*G06K 7/10* (2006.01)

(52) U.S. Cl.
USPC ............................................. 235/462.42

(58) Field of Classification Search
USPC ............. 235/462.41, 462.42, 472.01–472.03, 235/454
See application file for complete search history.

(56) References Cited

U.S. PATENT DOCUMENTS

| | | | | |
|---|---|---|---|---|
| 5,331,176 A | * | 7/1994 | Sant' Anselmo et al. | 250/566 |
| 5,834,749 A | * | 11/1998 | Durbin | 235/454 |
| 6,123,261 A | * | 9/2000 | Roustaei | 235/462.01 |
| 6,575,368 B1 | * | 6/2003 | Tamburrini et al. | 235/462.25 |
| 8,079,524 B2 | * | 12/2011 | He et al. | 235/462.41 |
| 8,091,788 B2 | * | 1/2012 | Olmstead | 235/462.41 |
| 2005/0035205 A1 | * | 2/2005 | Li | 235/462.21 |
| 2005/0218231 A1 | * | 10/2005 | Massieu | 235/472.01 |
| 2007/0284447 A1 | * | 12/2007 | McQueen | 235/454 |
| 2009/0206158 A1 | * | 8/2009 | Thuries et al. | 235/454 |

\* cited by examiner

*Primary Examiner* — Seung Lee
(74) *Attorney, Agent, or Firm* — Nong-Qiang Fan

(57) ABSTRACT

A method includes generating a first illumination with an illumination source, and directing the first illumination to pass through an aperture to generate an illumination pattern for defining an illumination field of view that is configured to indicate a boundary surrounding the imaging field of view of the imaging system. The intensity of the first illumination changes with time. The intensity variation of the illumination pattern is perceivable by a human user. The method also includes detecting light from the barcode with the imaging sensor to create imaging data while the barcode is illuminated by a second illumination, and processing the imaging data to decode an image of the barcode.

20 Claims, 7 Drawing Sheets

METHOD TO DIFFERENTIATE AIMING FROM ACTIVE DECODING

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more solid-state imagers for reading and decoding barcodes are typically referred to as imaging-based barcode readers, imaging scanners, or imaging readers. A solid-state imager generally includes a plurality of photosensitive elements or pixels aligned in one or more arrays. Examples of solid-state imagers include charged coupled devices (CCD) or complementary metal oxide semiconductor (CMOS) imaging chips.

SUMMARY

In one aspect, the invention is directed to a method of decoding a barcode within an imaging field of view of an imaging system that includes an imaging sensor. The method includes the following: (1) generating a first illumination with an illumination source; (2) directing the first illumination to pass through an aperture to generate an illumination pattern for defining an illumination field of view that is configured to indicate a boundary surrounding the imaging field of view of the imaging system; (3) detecting light from the barcode with an array of photosensitive elements in the imaging sensor to create imaging data during an exposure time period while the barcode is illuminated by a second illumination at least during a part of the exposure time period; and (4) processing the imaging data to decode an image of the barcode. In the method, the first illumination is configured to have the intensity thereof change with time to cause an intensity variation of the illumination pattern, with the intensity variation being perceivable by a human user.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
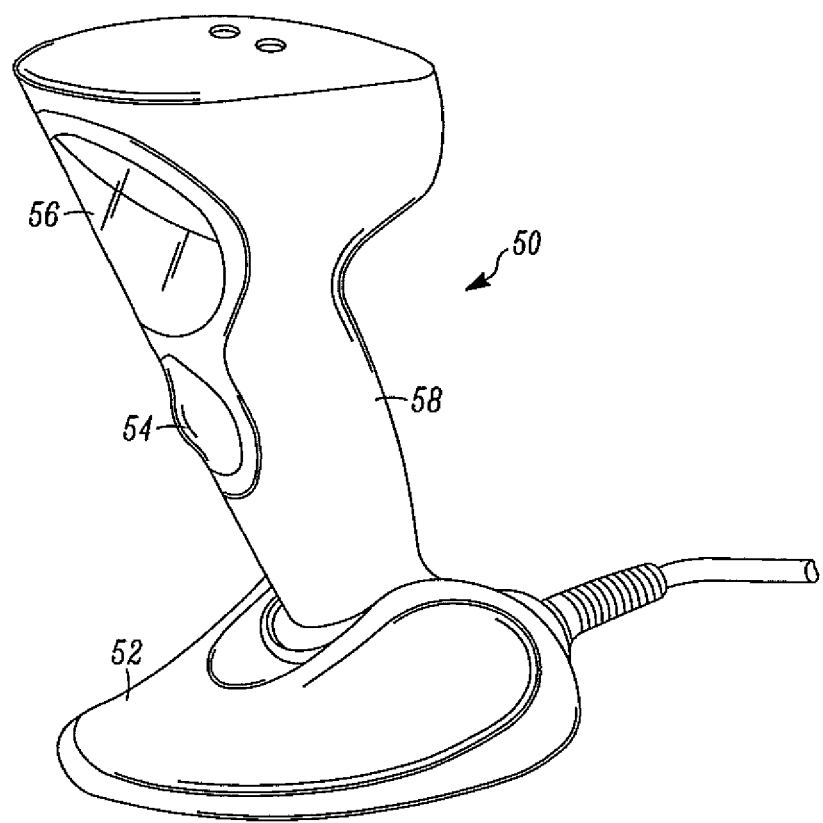
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
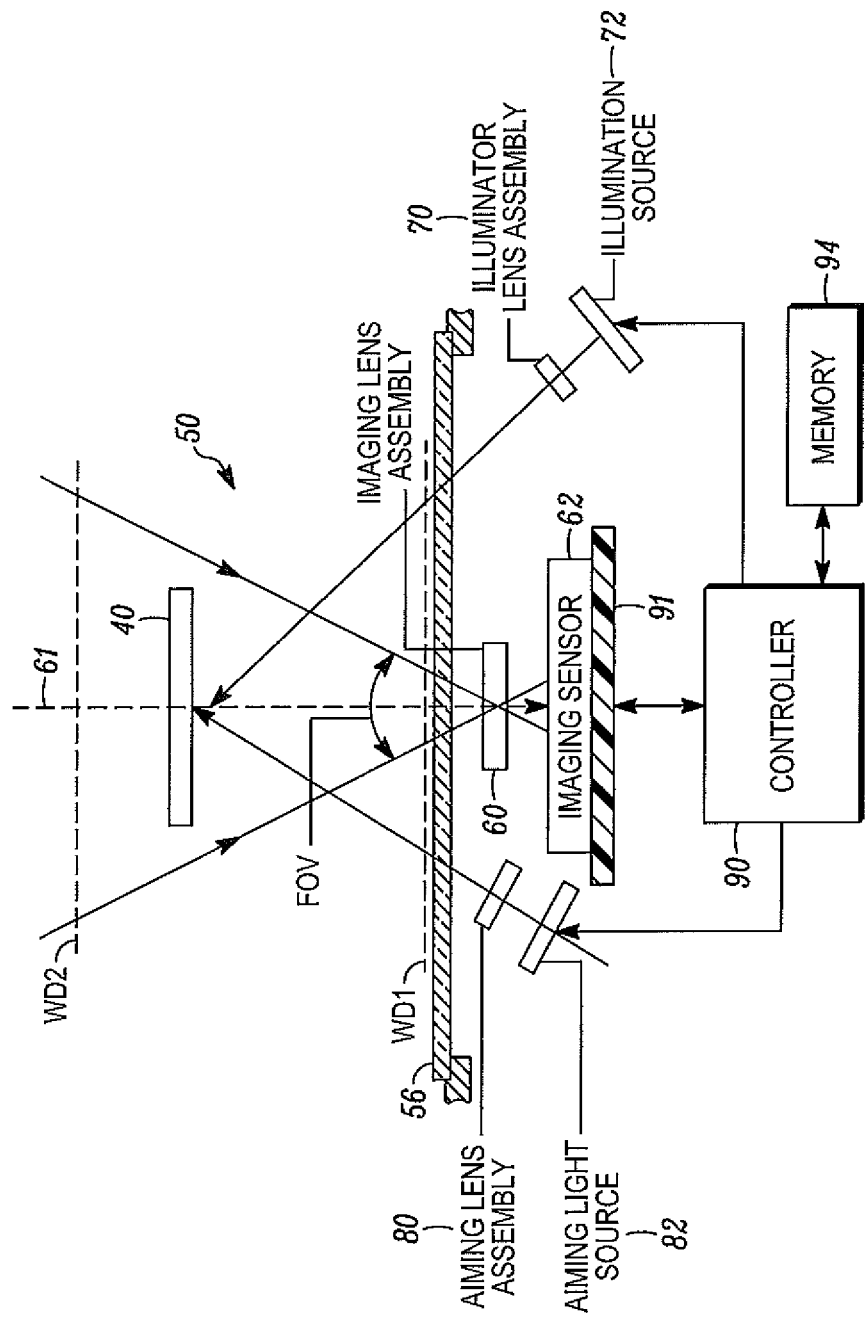
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming lens arrangement 80 positioned in front of an aiming light source 82; and (4) a controller 90. In FIG. 2, the imaging lens arrangement 60, the illuminating lens arrangement 70, and the aiming lens arrangement 80 are positioned behind the window 56. The imaging sensor 62 is mounted on a circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 60. Some of the imaging scanners can include an auto-focus system to enable a barcode be more clearly imaged with the imaging sensor 62 based on the measured distance of this barcode. In some implementations of the auto-focus system, the focus length of the imaging lens arrangement 60 is adjusted based on the measured distance of the barcode. In some other implementations of the auto-focus system, the distance between the imaging lens arrangement 60 and the imaging sensor 62 is adjusted based on the measured distance of the barcode.

In FIG. 2, the illuminating lens arrangement 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens arrangement 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

Figure 3:
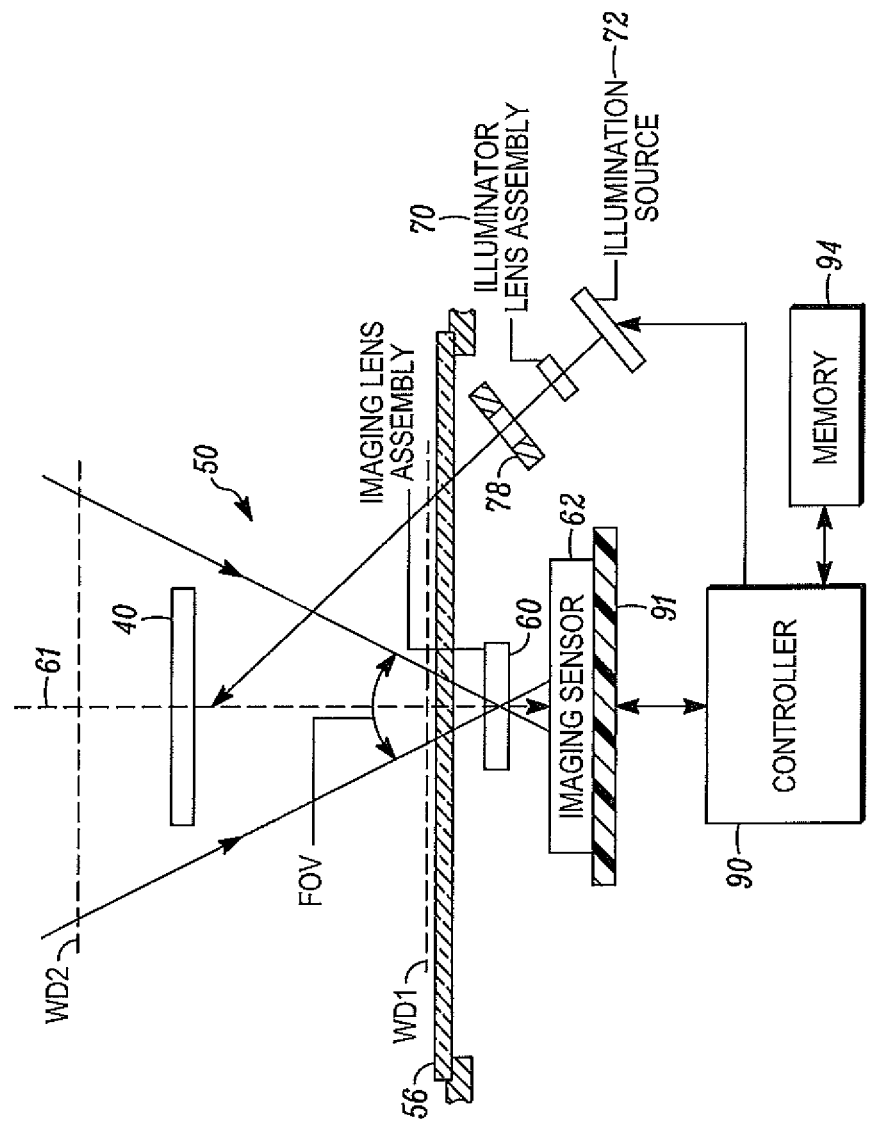
FIG. 3 is a schematic of an imaging scanner in which the illumination system is used for generating the visible aiming light pattern towards the barcode in accordance with some embodiments.

In some embodiments as shown in FIG. 3, the same illumination system can be used both for generating the aiming pattern and for providing the illumination for imaging the barcode. In these systems, an aperture 78 can be used in illumination system for generating an illumination field of view that is configured to indicate a boundary surrounding the imaging field of view (FOV).

Figure 4:
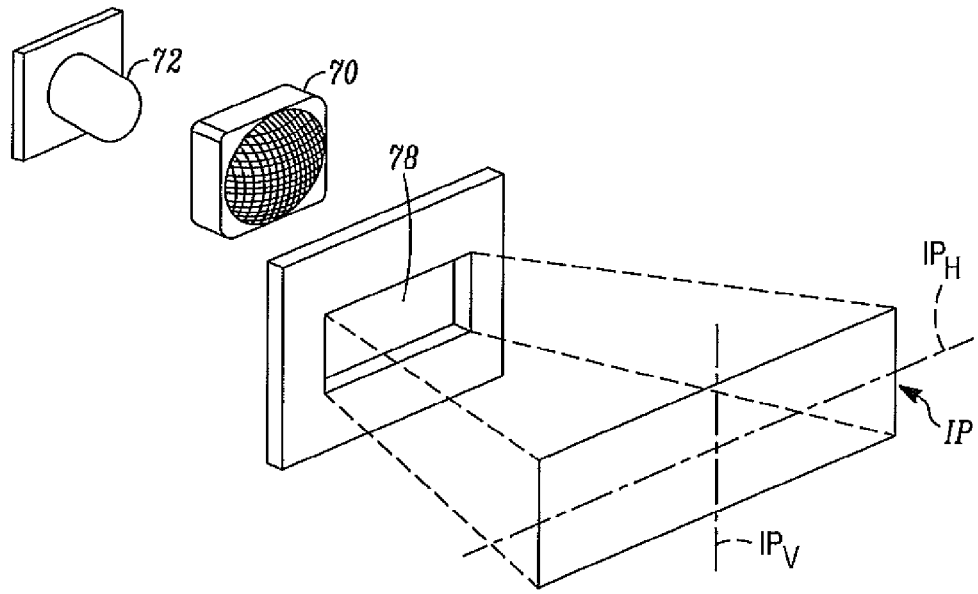
FIG. 4 is a schematic of the illumination system that includes an aperture having a generally rectangular opening for defining an illumination field of view in accordance with some embodiments.

In some embodiments as shown in FIG. 4, the illumination system includes an illumination source 72 for generating an illumination and an aperture 78 having a generally rectangular opening for defining an illumination field of view. The illumination source 72 can include one or more LEDs. The illumination source 72 can also be other kinds of light source, such as, a cold cathode lamp (CFL). In some embodiments, the illumination system can also include an illumination lens 70 deposited between the illumination source 72 and the aperture 78. The illumination lens 70 directs the illumination from the illumination source 72 through the aperture 78 to generate an illumination pattern IP that fills or substantially coincides with the field of view FOV of the imaging system. In the exemplary embodiment shown in FIGS. 4 and 5, the illumination pattern IP and field of view FOV are generally rectangular in shape.

Figure 5:
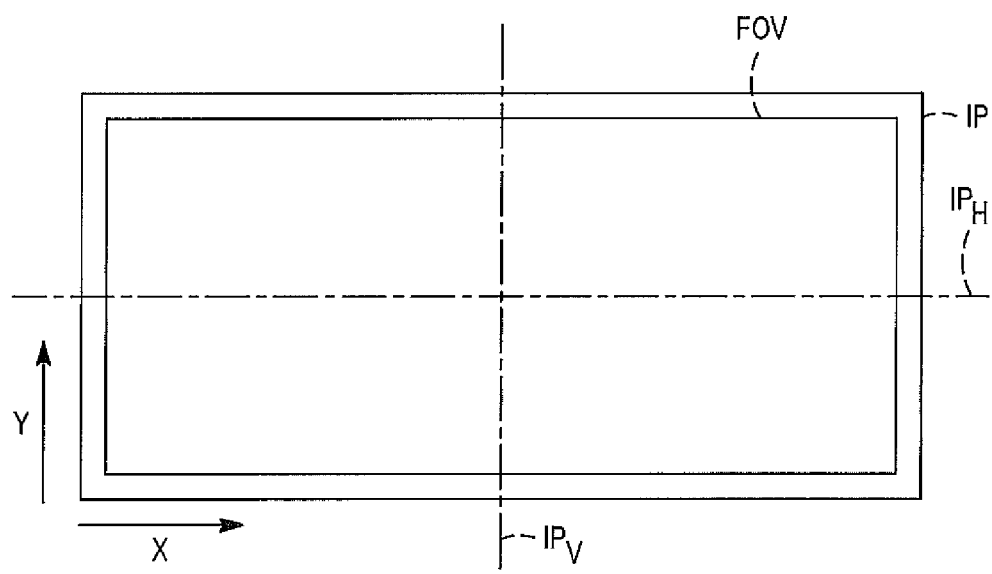
FIG. 5 depicts an illumination pattern IP with sharply defined edges that may be used to illuminate the object space in addition to functioning as the aiming system letting the user know where the imaging field of view FOV is located in accordance with some embodiments.

In FIG. 4 and FIG. 5, when the aperture 78 is used to limit the light projected onto the object space by the illumination lens 70, the end effect is an illumination pattern IP with sharply defined edges that may be used to illuminate the object space in addition to functioning as the aiming system letting the user know where the imaging field of view FOV is located.

Figure 6A:
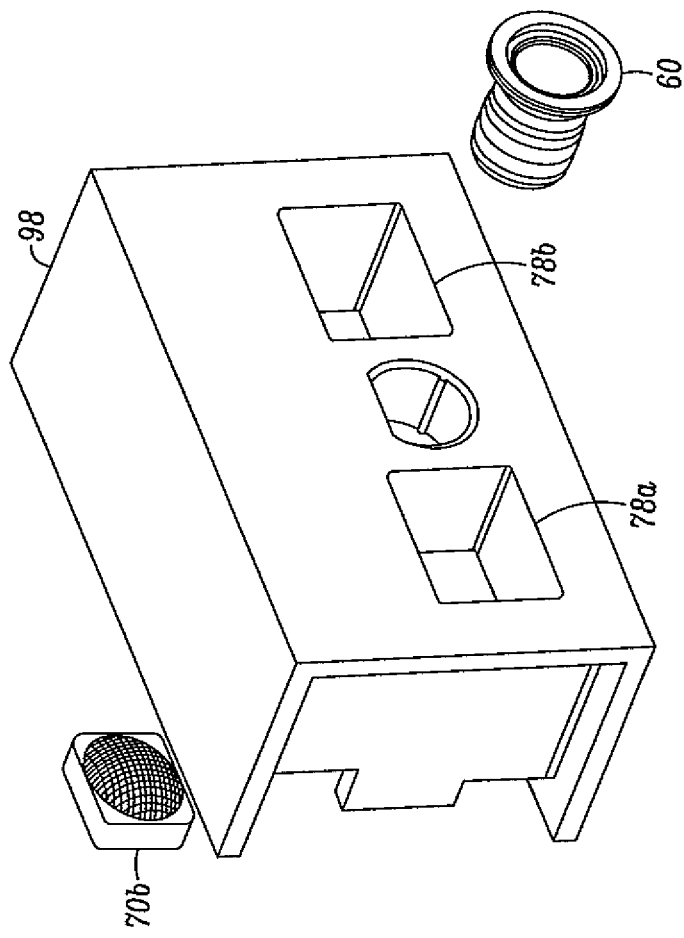
FIG. 6A and FIG. 6B illustrate that the aperture is formed on a chassis in the imaging scanner in accordance with some embodiments.
Figure 6A:
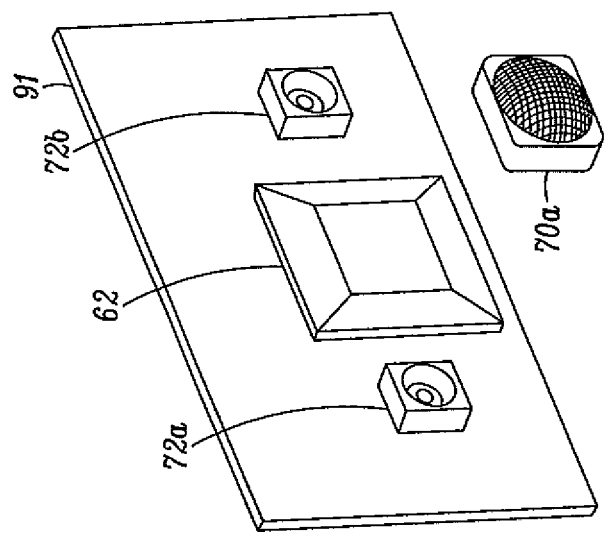
Figure 6B:
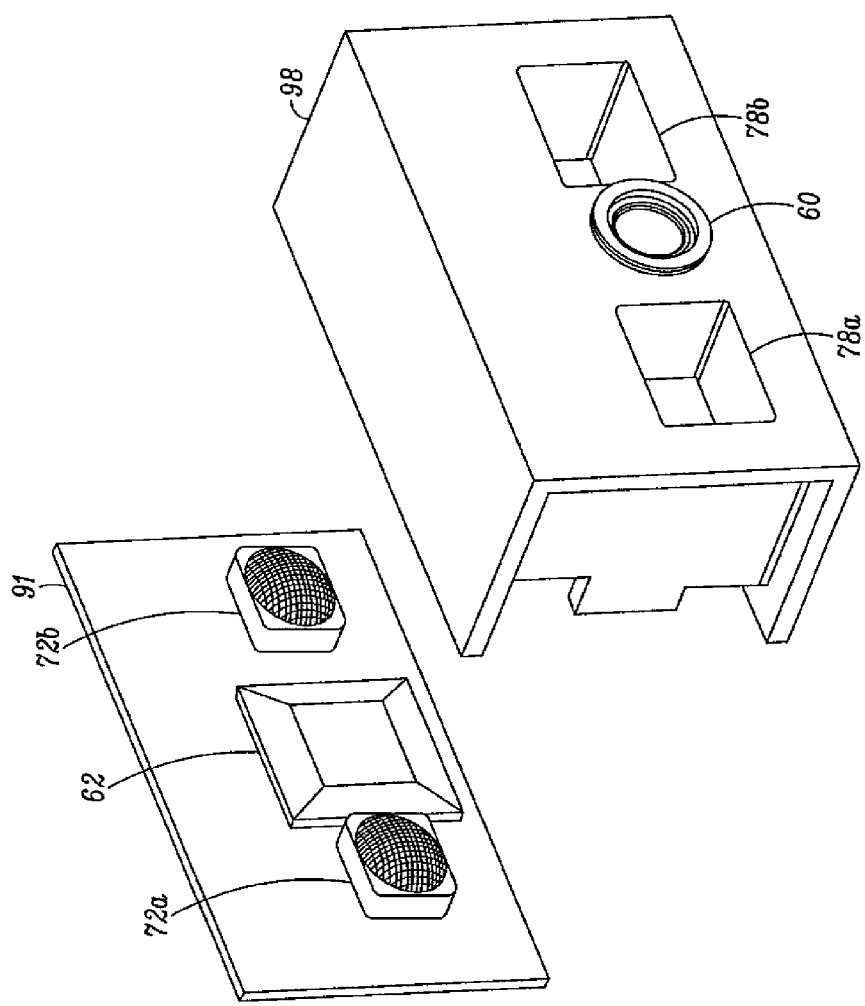

In some specific implementations as shown in FIG. 6A and FIG. 6B, the aperture can be formed on a chassis in the barcode reader. FIG. 6A and FIG. 6B depict a barcode reader that has the illumination source placed on a circuit board and the aperture formed on a chassis. As shown in FIG. 6A and FIG. 6B, the illumination source 72 including two LEDs 72a and 72b are placed on a circuit board 91. The imaging sensor 62 is also placed on the circuit board 91. The apertures 78a and 78b each having the rectangular opening are formed on the chassis 98. In some implementations, the apertures 78a and 78b and the chassis 98 can be formed as a single piece during an injecting mold process. In other implementations, the apertures 78a and 78b on the chassis 98 can be formed separately, and the separately constructed apertures 78a and 78b can be inserted into the openings on the chassis 98. In FIG. 6A and FIG. 6B, the imaging lens 60 is deposited within the chassis 98 for focusing light reflected from the target object onto the imaging sensor 62.

In the embodiments as shown in FIG. 3 and FIG. 4, when using the same illumination system both for generating the aiming pattern and for providing the illumination for imaging the barcode, it is not obvious when the scanner is actively decoding versus simply providing pre-aiming assistance. The result is that the scanner can appear to be broken to some users. In these circumstances, it is desirable to provide a better illumination system to improve the user experience.

Figure 7:
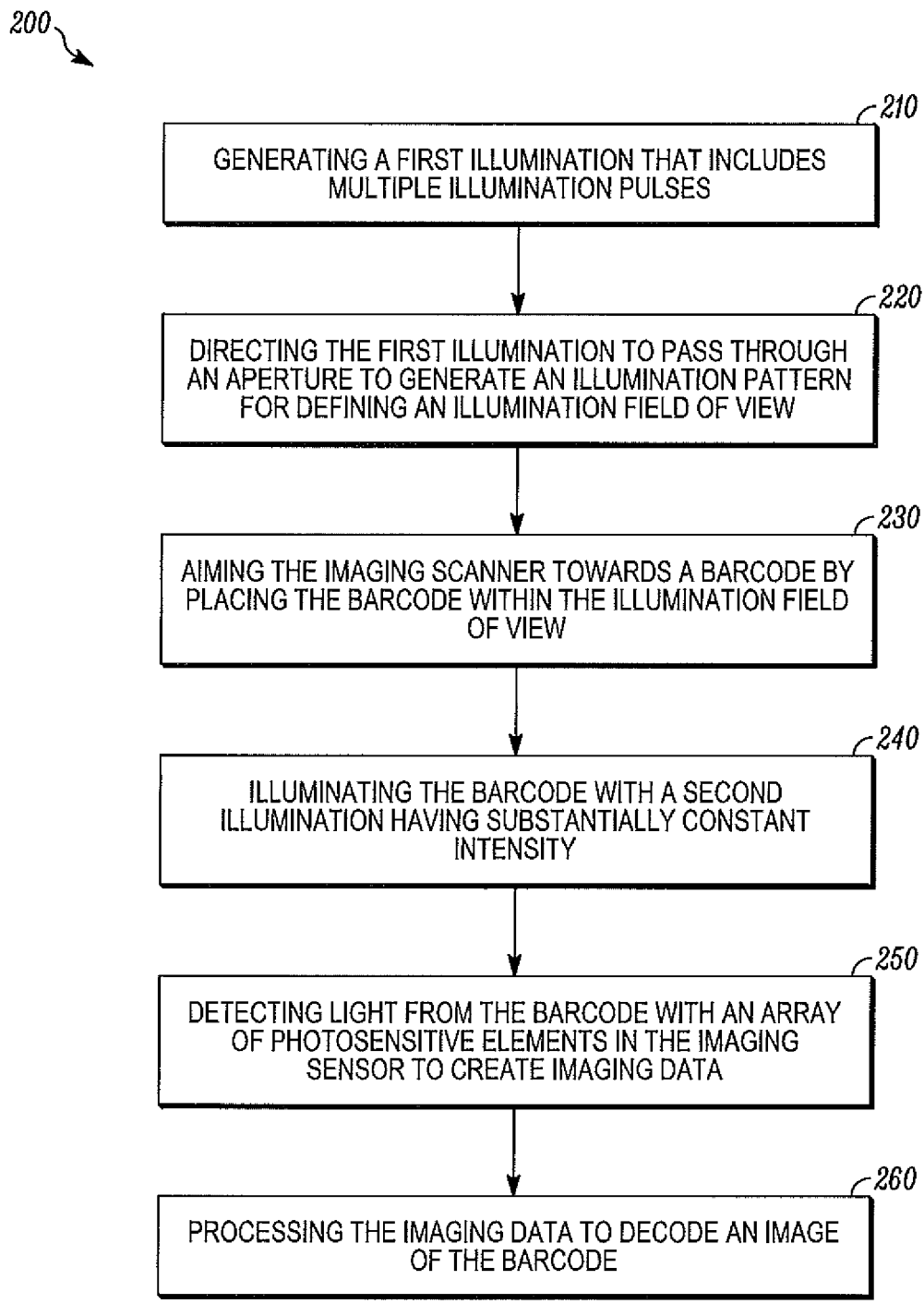
FIG. 7 is a flow chart of a method for using the same illumination system both for generating the aiming pattern and for providing the illumination for imaging the barcode in accordance with some embodiments.

FIG. 7 is a flow chart of a method 200 for using the same illumination system both for generating the aiming pattern and for providing the illumination for imaging the barcode in accordance with some embodiments. The method 200 includes blocks 210, 220, 230, 240, 250, and 260.

At block 210, a first illumination including multiple illumination pulses is generated. The multiple illumination pulses create some intensity variations of the first illumination and such intensity variations are generally perceivable by a human user. In some implementations, the first illumination is generated after pressing a trigger on an imaging scanner. At block 220, the first illumination is directed to pass through an aperture to generate an illumination pattern for defining an illumination field of view. For example, as shown in FIG. 4, the first illumination generated by the illumination source 72 passes through the aperture 78 and generates an illumination pattern IP. At block 230, the imaging scanner is aimed towards a barcode and the barcode is placed within the illumination field of view. At block 240, a second illumination having substantially constant intensity is generated to illuminate the barcode. At block 250, light from the barcode is detected with an array of photosensitive elements in the imaging sensor to create imaging data. Finally, at block 260, the imaging data from the imaging sensor is processed to decode an image of the barcode.

In some implementations, both the first illumination and the second illumination are terminated after the image of the barcode is decoded. If the first illumination and the second are generated from the same illumination source, light from the illumination source can be terminated after the image of the barcode is decoded. In some implementations, the step of generating the first illumination is initiated with a first triggering event (e.g., the pressing of a first trigger on the imaging scanner), and the step of generating the second illumination is initiated with a second triggering event (e.g., the pressing of a second trigger on the imaging scanner). In some implementations, the first illumination is not in the form of multiple pulses, and the first illumination can be modulated at a frequency that is less than 25 Hz to make the illumination generally perceivable by a human user. In some implementations, the intensity of the first illumination is substantially periodic with a corresponding time period that is more than 40 milliseconds.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of decoding a barcode within an imaging field of view of an imaging system that includes an imaging sensor, the method comprising:

generating a first illumination with an illumination source;

directing the first illumination to pass through an aperture to generate an illumination pattern for defining an illumination field of view that is configured to indicate a boundary surrounding the imaging field of view of the imaging system, wherein the first illumination is configured to have the intensity thereof change with time to cause an intensity variation of the illumination pattern, with the intensity variation being perceivable by a human user;

detecting light from the barcode with an array of photosensitive elements in the imaging sensor to create imaging data during an exposure time period while the barcode is illuminated by a second illumination at least during a part of the exposure time period; and processing the imaging data to decode an image of the barcode.

2. The method of claim 1, further comprising:
terminating the first illumination after the image of the barcode is decoded.

3. The method of claim 1, further comprising:
terminating light from the illumination source after the image of the barcode is decoded.

4. The method of claim 1, wherein said generating the first illumination is initiated with a first triggering event.

5. The method of claim 1, further comprising:
generating the second illumination with the illumination source.

6. The method of claim 1, wherein said generating the first illumination is initiated with a first triggering event, and said generating the second illumination is initiated with a second triggering event.

7. The method of claim 1, wherein the second illumination is a part of the first illumination.

8. The method of claim 1, wherein the second illumination maintains constant intensity.

9. The method of claim 1, wherein the first illumination includes multiple illumination pulses.

10. The method of claim 1, wherein the first illumination is modulated at a frequency that is less than 25 Hz.

11. The method of claim 1, wherein the intensity of the first illumination is periodic with a corresponding time period that is more than 40 milliseconds.

12. The method of claim 1, wherein said generating a first illumination pattern comprises:
directing the first illumination with an illumination lens to pass through the aperture to generate the illumination pattern.

13. A apparatus comprising:
an imaging lens arrangement;
an imaging sensor including an array of photosensitive elements configured to operate together with the imaging lens arrangement for detecting light from a target object within an imaging field of view;
means for generating a first illumination;
means for directing the first illumination to pass through an aperture to generate an illumination pattern for defining an illumination field of view that is configured to indicate a boundary surrounding the imaging field of view, wherein the first illumination is configured to have the intensity thereof vary with time to cause an intensity fluctuation of the illumination pattern, with the intensity fluctuation being perceivable by a human user;
means for detecting light from a barcode on the target object with the array of photosensitive elements in the imaging sensor to create imaging data during an exposure time period while the barcode is illuminated by a second illumination at least during a part of the exposure time period; and
means for processing the imaging data to decode an image of the barcode.

14. A apparatus comprising:
an imaging lens arrangement;
an imaging sensor including an array of photosensitive elements configured to operate together with the imaging lens arrangement for detecting light from a target object within an imaging field of view;
an illumination source for generating a first illumination;
an aperture configured for generating an illumination pattern for defining an illumination field of view when the first illumination passes through the aperture, wherein the illumination field of view is configured to indicate a boundary surrounding the imaging field of view; and
a controller for changing the intensity of the first illumination with time to cause an intensity variation of the illumination pattern, with the intensity variation being perceivable by a human user, for detecting light from a barcode on the target object with the array of photosensitive elements in the imaging sensor to create imaging data during an exposure time period while the barcode is illuminated by a second illumination at least during a part of the exposure time period, and for processing the imaging data to decode an image of the barcode.

15. The apparatus of claim 14, wherein the controller is further configured for:
terminating light from the illumination source after the image of the barcode is decoded.

16. The apparatus of claim 14, further comprising:
a first trigger operative to start the first illumination.

17. The apparatus of claim 14, wherein the illumination source is further configured for:
generating the second illumination.

18. The apparatus of claim 14, wherein the second illumination maintains constant intensity.

19. The apparatus of claim 14, wherein the first illumination includes multiple illumination pulses.

20. The apparatus of claim 14, further comprising:
an illumination lens positioned in an optical path between the illumination source and the aperture.

* * * * *